United States Patent
Gossweiler

(10) Patent No.: US 7,101,412 B2
(45) Date of Patent: Sep. 5, 2006

(54) SELF-SEALING PROTECTION FILTER PORT

(75) Inventor: Otto Gossweiler, Effretikon (CH)

(73) Assignee: TVI Corporation, Glenn Dale, MD (US)

( * ) Notice: Subject to any disclaimer, the term of this patent is extended or adjusted under 35 U.S.C. 154(b) by 72 days.

(21) Appl. No.: 10/715,434

(22) Filed: Nov. 19, 2003

(65) Prior Publication Data
US 2005/0102986 A1    May 19, 2005

(51) Int. Cl.
*B01D 35/00* (2006.01)
*B01D 46/00* (2006.01)

(52) U.S. Cl. .......... 55/502; 55/385.1; 55/417; 55/418; 55/420; 55/DIG. 35; 210/234; 210/235

(58) Field of Classification Search .......... 55/385.1, 55/410, 417, 418, 420, 562, DIG. 33, DIG. 35; 210/234, 235, 348
See application file for complete search history.

(56) References Cited

U.S. PATENT DOCUMENTS 3,715,032 A * 2/1973 Nicko .......... 210/234
3,852,196 A * 12/1974 Szpur .......... 210/234
4,529,514 A * 7/1985 Gruett .......... 210/234
4,682,993 A * 7/1987 Todd et al. .......... 210/235
5,914,037 A * 6/1999 Yen .......... 210/234

FOREIGN PATENT DOCUMENTS

DE      42 41 033 A1 *    6/1994

* cited by examiner

Primary Examiner—Jason M. Greene
(74) Attorney, Agent, or Firm—Whiteford Taylor & Preston LLP; R. Christopher Rueppell

(57) ABSTRACT

A self-sealing protection filter port for gas masks prevents contamination of the inner-environment of the mask during exchange of filters and therefore increases safety. A biased valve closes the air inlet to the port when the protection filter is not installed. As a new filter is inserted, the valve is forced open, allowing filtered air to flow through the air inlet to the user. The protection filter engages the filter port using a retaining element. The self-sealing protection filter in a protection mask having an internal close-biased valve is installed in the standard protection filter port of the mask.

58 Claims, 3 Drawing Sheets

SELF-SEALING PROTECTION FILTER PORT

BACKGROUND OF THE INVENTION

1. Field of the Invention

The present invention relates to a self-sealing protection filter port attachable to a powered air-purifying respirator.

2. Description of Related Art

Respiratory devices, such as protection masks, also interchangeably referred to herein as gas masks or masks, are well known. Civilians, law enforcement, military personnel, fire fighters and other groups of individuals commonly referred to as responders, hereinafter referred to as users, wear masks for protection from an environment containing harmful and possibly fatal air-born toxins or any other such hazardous material. Such toxins and materials are hazardous to respiratory systems and generally take the form of harmful gases, vapors, and particulate matter. The respiratory hazards may also include various agents, such as nuclear, biological and chemical (NBC) agents, which may be in the form of particulates, vapors or aerosols.

One type of breathing apparatus, known as a Powered Air Purifying Respirator (PAPR), is a fan-forced positive pressure breathing apparatus. PAPRs are used in environments where the ambient air is relatively oxygen-rich and where filtering elements are effective in removing all contaminants from the ambient air before the ambient air enters the gas mask. PAPRs typically include a gas mask, a filtering element to remove contaminants from ambient air, a blowing element, such as, a fan, and a power source to provide operational power to the blowing element. The fan or blowing element continuously supplies filtered air to the gas mask. The filtered air replenishes the internal space of the mask, and exhaled air, also known as spent air, is continually ejected.

The filtering elements of PAPRs typically have a maximum capacity, i.e., the filtering elements capture and filter a finite amount of contaminants before the filter reaches an upper limit of contaminants the filter is able to capture. Once the filter reaches the upper limit, it no longer has the ability to capture, reduce, or filter contaminants passing to the user. Therefore, in order to sustain the protective qualities of the PAPR, the user must regularly replace the filter.

The exchange of filter ports is typically a hazardous action by the user. For instance, a user surrounded by contaminated ambient air relies on the filter of the PAPR to remove contaminants from the ambient air, so the user may safely inhale the filtered air. During exchange of the filter port, the filter is removed from the PAPR for a brief period of time. While the filter is removed, the ambient air, which may contain contaminants, is typically unmitigated while the filter on the PAPR is removed and may pass to the user. The user is susceptible to the contaminants in the ambient air, which may harm or possibly kill the user, if the ambient air is ingested, inhaled or otherwise contacts the user's skin or respiratory orifices.

There is a need for a PAPR mask that improves operation and use of the filter port by reducing, at all times, the amount of contaminants passed to the user, and in turn, facilitating breathing for the user. There is a further need for a filter port in a PAPR mask that allows the user to replace the filter without increasing susceptibility to ambient contaminants or rendering the user vulnerable to such contaminants.

SUMMARY OF THE INVENTION

Aspects of the present invention provide a self-sealing protection filter port that is used in conjunction with a PAPR and that reduces or prevents entry of contaminants into the inner space of the gas mask, particularly during the time when filters are being replaced. Furthermore, aspects of the present invention increase the safety provided to the user at other times.

One aspect of the present invention relates to a self-sealing protection filter of a gas mask having a biased valve, such as a spring, for example. As the protection filter is removed, the valve biasedly closes the air inlet to the protection port. Conversely, as a new filter is inserted, the valve is forced open, allowing filtered air to flow through the air inlet to the user.

Another aspect of the present invention relates to a structural mechanism to retain the protection filter in the gas mask and to allow act of replace the protection filter quickly and easily. In one variation, the protection filter is held by a snap-lock feature, screwable thread, or any other retaining structure known in the art. The snap-lock feature, screwable thread or other retaining structures allow the protection filter to be removed from the gas mask and to be reaffixed as needed.

In still an additional aspect of the invention, the self-sealing protection filter is installed in a standard protection filter port of the mask.

Additional advantages and novel features of the present invention will become more apparent from the following description.

DETAILED DESCRIPTION OF THE PRESENT INVENTION

The present invention includes a self-sealing protection filter port for a protection mask, such as, for example, a powered air-purifying respirator. In one embodiment, the present invention provides a filter port member, such as a valve, that allows a virtually contamination free exchange of protection filters for breathing protection systems.

Figure 1:
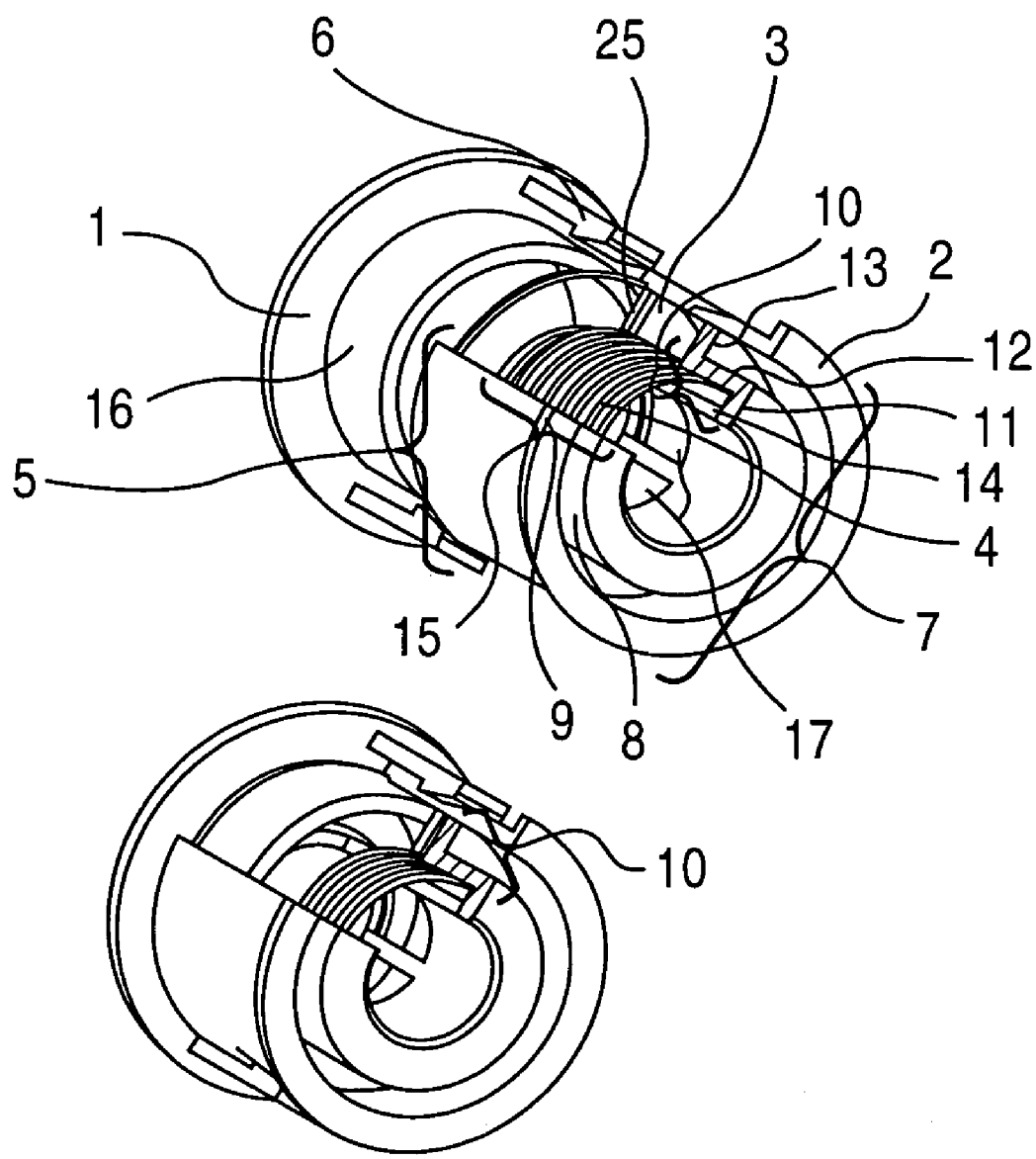
FIG. 1 is a perspective view of a self-sealing protection filter port, in accordance with one embodiment of the present invention.

In FIG. 1, in one embodiment of the invention, a filter connecting member 1, also referred to herein as a filter connector, is attached to a filter port 5 using a snap-on member, thread and screw member, or any other known suitable engaging member. In the illustrated exemplary embodiment, the filter connector 1 is attached to the filter port 5 using a snap-on member 6.

The filter port 5 includes a filter port housing 2, which provides the general structure for the filter port 5. The filter port housing 2 has a base 7, an external housing 9 that is engagable with the filter connector 1, and an internal housing 8 that is connected to the external housing 9 at the base 7. The base 7 of the filter port housing 2 has a connecting body 10, which connects the internal housing 9 and the external housing 8. A projection member 16 of the filter connector 1 engages the filter port 5 between the internal housing 8 and the external housing 9. The shape of the inner wall of the external housing 9 corresponds to the shape of the outer wall of the projection member 16 of the filter connector 1. In one variation, the inner wall of the external housing 9 includes threads that are able to meshably engage corresponding threads of the protection filter connector 1. In another variation, the inner wall of the external housing 9 is substantially smooth and accommodates a corresponding smooth external wall of the protection filter connector 1.

In the embodiment shown in FIG. 1, the internal housing 8 has at least one opening 17, also referred to herein as an air inlet or aperture, which allows air to pass though the filter port 5. In one variation, the internal housing 8 has a plurality of openings 17 in the internal housing 8. The opening or openings 17 may be disposed at any location on the internal housing 8. In one variation, the plurality of openings 17 are disposed on the distal end relative to the base 7 of the filter port 5.

In some embodiments, the internal housing 8 is solid at the base 7. In one embodiment, the connecting body 10 is attached to the internal housing 8 and the external 9 forming the closed base 7. In one variation of the invention, the connecting body 10, which links the internal housing 8 and the external housing 9, is "S" cross-sectionally shaped, as shown in FIG. 1. The "S" shape of the connecting body 10 is defined by a structural relationship between the internal housing 8, the external housing 9, and the connecting body 10. More specifically, the "S" shape is formed from a first horizontal member 11 extending from the internal housing 8 and connecting to a first end of a vertical member 12 and a second horizontal member 11 extending from the external housing 9 and connecting to a second end of the vertical member 12. In one embodiment, a biased valve resting area 14, also known as herein a spring resting area, is defined by the region bounded by the internal housing 8, a first horizontal member 11 of the "S" shaped connecting body 10, and the vertical member 12 of the "S" shaped connecting body 10.

The longitudinal axis of the filter port 5 is defined as the direction from a portion of the filter port 5 extending from the base 7 to the filter connector 1. A biased valve 15 includes a valve biasing mechanism 4 (generally known hereinafter as a spring or valve spring), such as a spring and other similar devices known in the art, and a valve seat 3 abutted or attached to one end of the valve spring 4. An end of the valve spring 4, i.e., an end of the valve spring 4 that does not attach to the valve seat 3, abuts the spring resting area 14. The valve spring 4 coils around the internal housing 8 and extends along the longitudinal axis of the internal housing 8. The spring 4 biasedly opposes compression. In one variation, when the valve spring 4 is compressed, the valve seat 3 can rest against the second horizontal member 13 of the "S" connecting body 10. In one variation of the present invention, the valve seat 3 is a single planar member abutting or attached to the spring 4. In another variation, the valve seat 3 is an "L" cross-sectionally shaped or bi-planar member, in which one plane extends into the spring resting area 14. The bi-planar structure of the valve seat 3 provides stability to the filter port 5 and prevents undesired lateral movement of the valve seat 3, especially when the filter port 5 is engaged to the filter connector 1, i.e., the valve spring 4 is compressed and the second plane of the valve seat 3 is supported in the spring resting area 14.

In one variation, a filter seal 25 is integrated with the valve seat 3. In another variation, the filter seal 25 abuts the valve seat 3 and is preferably disposed on the side of valve seat 3 opposite the base 7. The filter seal 25 may be formed from any suitable sealing material known in the art that can form an airtight seal, including, for example, rubber or polymers.

Figure 2:
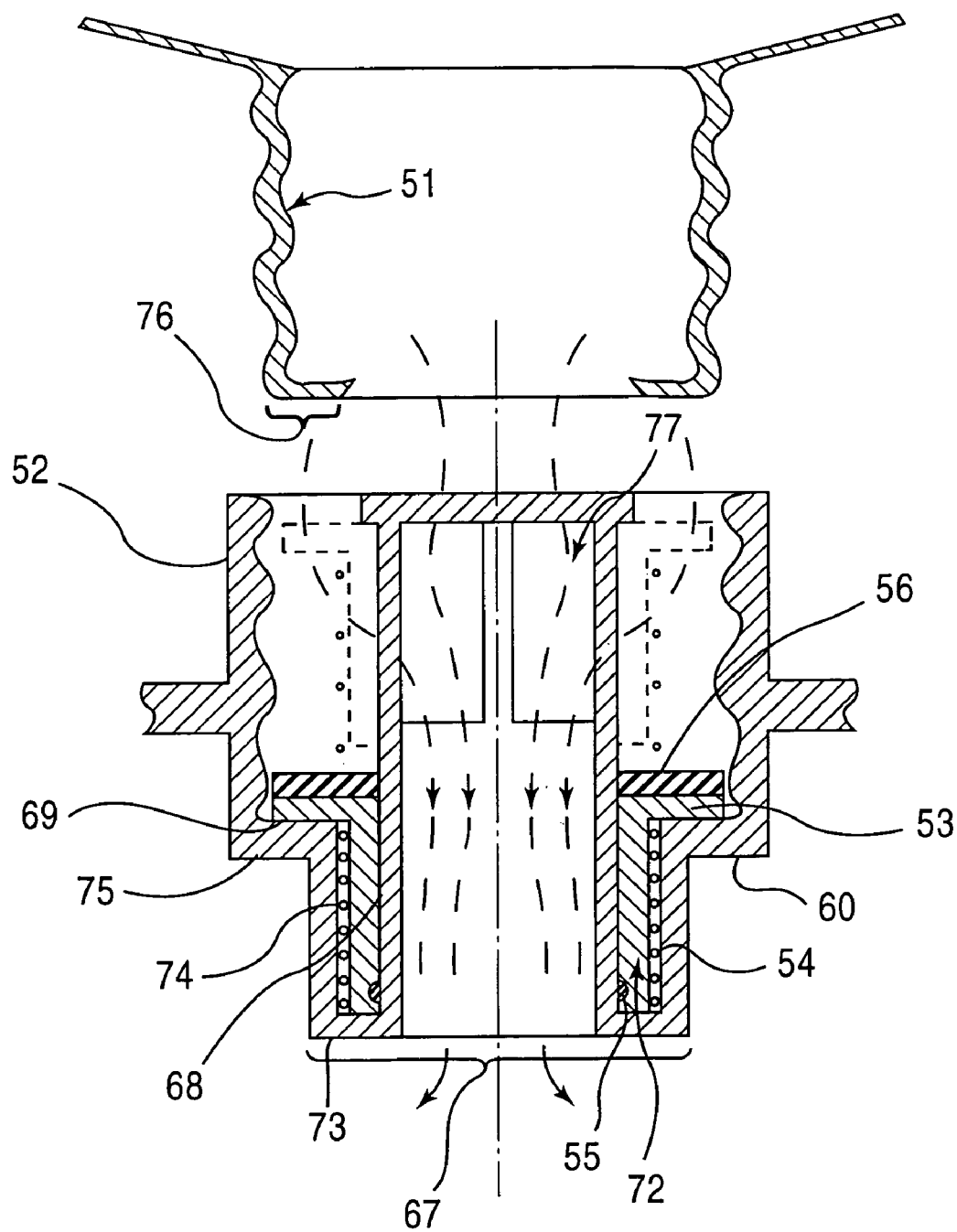
FIG. 2 is a cross-sectional view illustrating a filter screwably engaging the filter port, in accordance with one embodiment of the present invention.

FIG. 2 illustrates another embodiment of the present invention. A filter 51 is engagable with a filter port 52, having an external housing 69 and an internal housing 68. Air flows through one or more apertures or openings 77 formed in the internal housing 68. A projection member 76 extends radially inward from an open end of the filter 51 and engages the filter port 52 between the external housing 69 and the internal housing 68. The external housing 69 of the filter port is connected to the internal housing 68 of the filter port 52 by a connecting body 60, which in this variation is "S" cross-sectionally shaped, to form a base 67. The "S" shape of the connecting body is attributed to a first horizontal member 73 extending from the base 67 end of the internal housing 68 and attached to one end of a vertical member 74 and a second horizontal member 75 extending from the corresponding base 67 end of the external housing 69 and attached to a second end of the vertical member 74.

A spring 54, which biasedly opposes compression, rests in a spring resting area 72, defined by the internal housing 68, a first horizontal member 73 of the "S" shaped connecting body 60, and a vertical member 74 of the "S" shaped connecting body 60. In one variation, the spring resting area 72 is defined by the base 67, the internal housing 68, and the external housing 69. An O-ring 55 may be formed from any suitable sealing material known in the art that can form an airtight seal, including, for example, rubber or polymers. The O-ring is disposed around the circumference of the internal housing 68 in the spring resting area 72 and provides a secondary seal. The spring 54 coils about the internal housing 68 and is extendable along the longitudinal axis of the internal housing 68. The end of the spring 54 distal from the spring resting area 72 includes a valve seat 53, which is attachable to the spring 54. In this embodiment, the valve seat 53 extends in two directions, which are orthogonal relative to one another. One portion of the valve seat 53, which is ring-shaped, generally extends parallel to the ring-shaped filter seal 56. The second portion of the valve seat 53 extends perpendicular to the plane of the ring-shaped first portion of the filter seal 56. The second plane of the valve seat extends into the spring resting area 72 when the spring 54 is compressed to certain positions. In one variation, the two portions of the valve seat 53 are generally not orthogonal relative to one another. In another variation, the valve seat 53 extends generally in one plane, i.e., the plane that allows the formation of a seal on the filter port 52.

In FIG. 2, when the spring 54 is in the shown compressed position, the first portion of the valve seat 53 is movable up to a position at which the seat 53 abuts the second horizontal member 75 of the connecting body 60. In one variation of the present invention, the valve seat 53 does not rest on the member 75 when fully engaged. In such a variation, the spring 54 is merely compressed as necessary for operation. For example, the spring 54 is compressed as far as the protection filter 51 requires when inserted into the filter port 52 so as to allow installation in a filter port 52. A filter seal 56, otherwise referred to herein as a seal, is positioned on the surface of the valve seat 53, opposite the surface of the valve seat 53 that faces the second horizontal member 75. The filter seal 56 is made of, for example, rubber or any other well known material that is capable of sealing.

The spring 54, which biasedly opposes compression, compresses and expands depending on the engagement of the protection filter 51 with the filter port 52. When the protection filter 51 is engaged with the filter port 52, the spring 54 is compressed. When the protection filter 51 is disengaged from the filter port 52, the spring 54 expands to its maximum length. The expansion of the spring 54 from a compressed position causes the valve seat 53 and the filter seal 56 to travel along the longitudinal axis of the filter port 52. At the maximum length of the spring 54, the filter seal 56 is disposed in the filter port 52, i.e., along the longitudinal axis of the filter port 56 between the internal housing 68 and the external housing 69, to sealably prevent air from entering any one of the plurality of openings 77.

Figure 3:
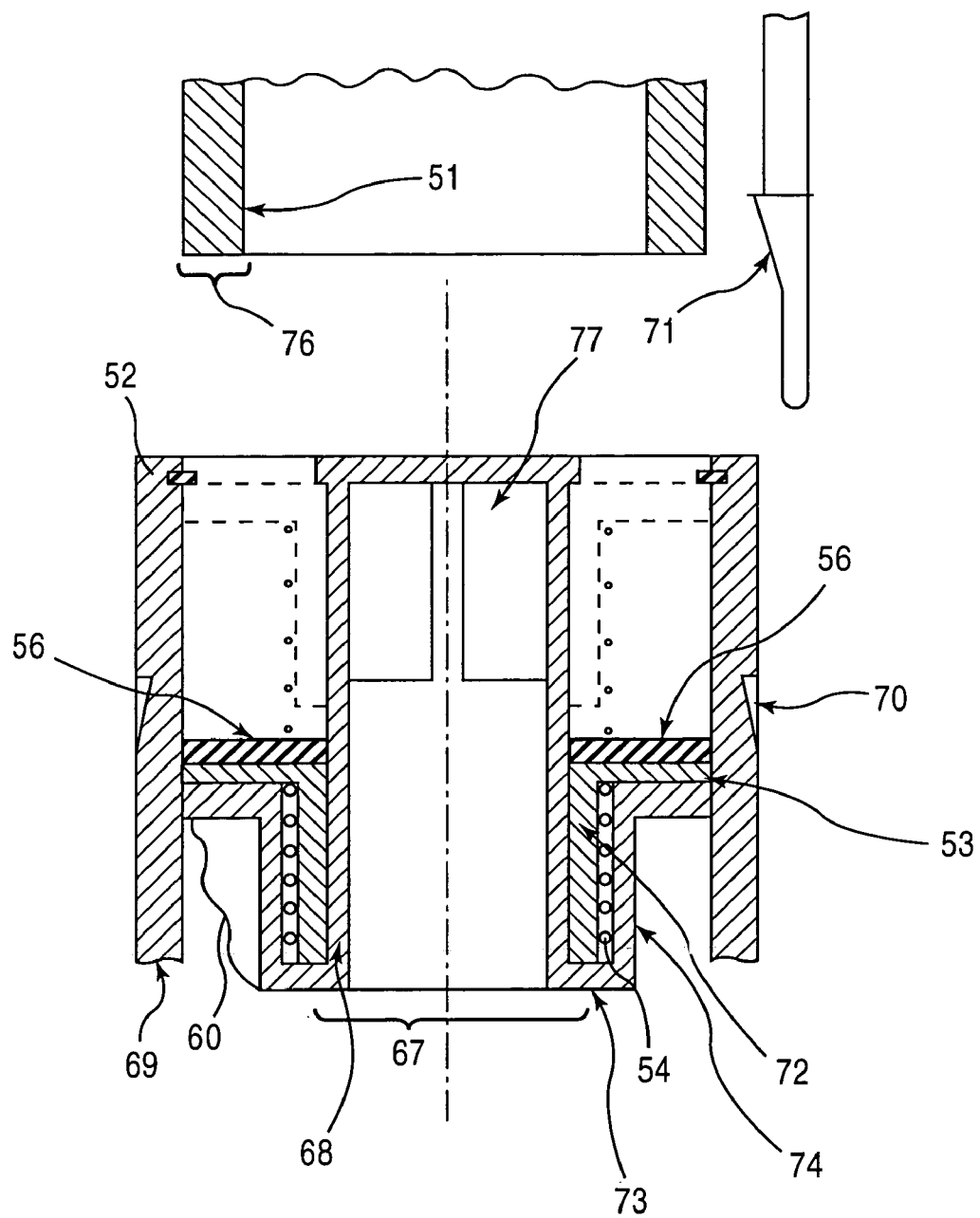
FIG. 3 is a cross-sectional view illustrating a snap-on or clip-on filter engagable and retainable in the filter port, in accordance with one embodiment of the present invention.

FIG. 3 illustrates yet another embodiment of the present invention. This embodiment is similar to that shown in FIG. 2, with the exception of the structure used to engage the protection filter 51 and the filter port 52. In this embodiment, the outer wall of the external housing 69 includes a receiving feature 70, which is depicted in this figure as an indented cavity. The indented cavity may be of any appropriate size and shape to meet the functionality required. The protection filter 51 used with the embodiment includes extending locking member 71. In this embodiment, the receiving feature 70 and the locking member 71 engage and retain engagement by interlocking the receiving member 70 and the locking member 71. This structure is generally known in the art as a snap-on feature.

While there has been described what are at present considered to be preferred embodiments of the present invention, it will be understood that various modifications may be made thereto, and it is intended that the appended claims cover all such modifications as fall within the true spirit and scope of the invention. Other modifications will be apparent to those skilled in the art.

What is claimed is:

1. A self-sealing protection filter port connectable to a filter, the filter port comprising:
   a housing;
   a sealable opening within the housing;
   a biasing member disposed within the housing; and
   a filter seal connected to the biasing member,
   wherein the sealable opening is open, and the filter communicates with the opening when the filter is connected to the filter port, and
   wherein the sealable opening is perpendicular to a longitudinal axis of the filter port and the biasing member is biased along the longitudinal axis of the filter port to seal the opening when the filter is disconnected from the filter port.

2. The filter port according to claim 1, wherein the filter seal comprises:
   a rubber or polymer capable of providing an air-tight seal.

3. The filter port according to claim 1, wherein the filter port further comprises:
   an external housing connected to an internal housing at a base to form a closed end.

4. The filter port according to claim 3, wherein the internal housing has at least one air inlet.

5. The filter port according to claim 3, wherein the biasing member is extendable and compressible along the longitudinal axis of the filter port.

6. The filter port according to claim 3, wherein the filter is disposed between the internal housing and the external housing and is retained therebetween by one selected from a group consisting of: a screwable thread, an interlocking part, a snap-on device, a removable adhesive, and a magnetic retaining device.

7. The filter port according to claim 3, wherein the base includes an "S" cross-sectionally shaped connecting body comprising:
   a vertical member;
   a first horizontal member extending from a first end of the internal housing disposed at the base to a first end of the vertical member; and
   a second horizontal member extending from a first end of the external member at the base to a second end of the vertical member.

8. The filter port according to claim 7, wherein the vertical member, the first horizontal member, and the internal housing form a spring resting area for the compressed spring.

9. The filter port according to claim 8, further comprising:
   an O-ring disposed around an outer surface of the internal housing in the spring resting area.

10. The filter port according to claim 8, further comprising:
    a valve seat attached to the second horizontal member.

11. The filter port according to claim 9, wherein the valve seat is a single planar member perpendicular to the longitudinal axis of the filter port.

12. The filter port according to claim 9, wherein the valve seat is a biplanar member having a first plane resting on the second horizontal member and a second plane extending parallel to the longitudinal axis of the filter port.

13. The filter port according to claim 11, wherein the filter seal sealably abuts the valve seat and is disposed in parallel to the axis of the first horizontal member.

14. The filter port according to claim 12, wherein the filter seal sealably abuts the valve seat and is disposed in parallel to the axis of the first horizontal member.

15. The filter port according to claim 12, wherein the biasing member is operationally connected to the valve seat and the filter seal, the biasing member preventing entry of ambient air through an air inlet.

16. The filter port according to claim 15, wherein the spring member is connected to the valve seat and the filter seal to form a movable seal that prevents entry of ambient air through an air inlet.

17. The filter port according to claim 16, wherein the filter seal travels along the longitudinal axis with the biasing member of the filter port relative to the base and reaches a resting location that sealably prevents ambient air from entering the opening when the filter is disengaged from the filter port.

18. The filter port according to claim 17, wherein the filter seal forms the movable seal at a resting location when the biasing member attains a maximum point of expansion.

19. The filter port according to claim 18, wherein the biasing member is compressed when the protection filter is connected to the filter port.

20. The filter port according to claim 1, wherein the filter is isntallabel in a filter port protrusion on a gas mask.

21. A self-sealing protection filter port connectable to a filter, the filter port comprising:
    a housing;
    a sealable opening within the housing;
    a biasing member disposed within the housing; and
    a filter seal connected to the biasing member,
    wherein the sealable opening is open, and the filter communicates with the opening when the filter is connected to the filter port,
    wherein the biasing member is biased to seal the opening when the filter is disconnected from the filter port, and wherein the filter port further comprises an external housing connected to an internal housing at a base to form a closed end.

22. The filter port according to claim 21, wherein the filter seal comprises:
a rubber or polymer capable of providing an air-tight seal.

23. The filter port according to claim 21, wherein the internal housing has at least one air inlet.

24. The filter port according to claim 21, wherein the biasing member is extendable and compressible along a longitudinal axis of the filter port.

25. The filter port according to claim 21, wherein the filter is disposed between the internal housing and the external housing and is retained therebetween by one selected from a group consisting of: a screwable thread, an interlocking part, a snap-on device, a removable adhesive, and a magnetic retaining device.

26. The filter port according to claim 21, wherein the base includes an "S" cross-sectionally shaped connecting body comprising:
a vertical member;
a first horizontal member extending from a first end of the internal housing disposed at the base to a first end of the vertical member; and
a second horizontal member extending from a first end of the external member at the base to a second end of the vertical member.

27. The filter port according to claim 26, wherein the vertical member, the first horizontal member, and the internal housing form a spring resting area for the compressed spring.

28. The filter port according to claim 27, further comprising:
an O-ring disposed around an outer surface of the internal housing in the spring resting area.

29. The filter port according to claim 27, further comprising:
a valve seat attached to the second horizontal member.

30. The filter port according to claim 28, wherein the valve seat is a single planar member perpendicular to a longitudinal axis of the filter port.

31. The filter port according to claim 28, wherein the valve seat is a biplanar member having a first plane resting on the second horizontal member and a second plane extending parallel to the longitudinal axis of the filter port.

32. The filter port according to claim 30, wherein the filter seal sealably abuts the valve seat and is disposed in parallel to the axis of the first horizontal member.

33. The filter port according to claim 31, wherein the filter seal sealably abuts the valve seat and is disposed in parallel to the axis of the first horizontal member.

34. The filter port according to claim 31, wherein the biasing member is operationally connected to the valve seat and the filter seal, the biasing member preventing entry of ambient air through an air inlet.

35. The filter port according to claim 34, wherein the spring member is connected to the valve seat and the filter seal to form a movable seal that prevents entry of ambient air through an air inlet.

36. The filter port according to claim 35, wherein the filter seal travels along the longitudinal axis with the biasing member of the filter port relative to the base and reaches a resting location that sealably prevents ambient air from entering the opening when the filter is disengaged from the filter port.

37. The filter port according to claim 36, wherein the filter seal forms the movable seal at a resting location when the biasing member attains a maximum point of expansion.

38. The filter port according to claim 37, wherein the biasing member is compressed when the protection filter is connected to the filter port.

39. The filter port according to claim 21, wherein the filter is installable in a filter port protrusion on a gas mask.

40. A self-sealing protection filter port connectable to a filter, the filter port comprising:
a housing;
a sealable opening within the housing;
a biasing member disposed within the housing; and
a filter seal connected to the biasing member,
wherein the sealable opening is open, and the filter communicates with the opening when the filter is connected to the filter port,
wherein the biasing member is biased to seal the opening when the filter is disconnected from the filter port, and
wherein the filter is installable in a filter port protrusion on a gas mask.

41. The filter port according to claim 40, wherein the filter seal comprises:
a rubber or polymer capable of providing an air-tight seal.

42. The filter port according to claim 41, wherein the filter port further comprises:
an external housing connected to the internal housing at a base to form a closed end.

43. The filter port according to claim 42, wherein the internal housing has at least one air inlet.

44. The filter port according to claim 42, wherein the biasing member is extendable and compressible along a longitudinal axis of the filter port.

45. The filter port according to claim 42, wherein the filter is disposed between the internal housing and the external housing and is retained therebetween by one selected from a group consisting of: a screwable thread, an interlocking part, a snap-on device, a removable adhesive, and a magnetic retaining device.

46. The filter port according to claim 42, wherein the base includes an "S" cross-sectionally shaped connecting body comprising:
a vertical member;
a first horizontal member extending from a first end of the internal housing disposed at the base to a first end of the vertical member; and
a second horizontal member extending from a first end of the external member at the base to a second end of the vertical member.

47. The filter port according to claim 46, wherein the vertical member, the first horizontal member, and the internal housing form a spring resting area for the compressed spring.

48. The filter port according to claim 47, further comprising:
an 0-ring disposed around an outer surface of the internal housing in the spring resting area.

49. The filter port according to claim 46, further comprising:
a valve seat attached to the second horizontal member.

50. The filter port according to claim 48, wherein the valve seat is a single planar member perpendicular to the longitudinal axis of the filter port.

51. The filter port according to claim 48, wherein the valve seat is a biplanar member having a first plane resting on the second horizontal member and a second plane extending parallel to the longitudinal axis of the filter port.

52. The filter port according to claim 50, wherein the filter seal sealably abuts the valve seat and is disposed in parallel to the axis of the first horizontal member.

53. The filter port according to claim 51, wherein the filter seal sealably abuts the valve seat and is disposed in parallel to the axis of the first horizontal member.

54. The filter port according to claim 51, wherein the biasing member is operationally connected to the valve seat and the filter seal, the biasing member preventing entry of ambient air through an air inlet.

55. The filter port according to claim 54, wherein the spring member is connected to the valve seat and the filter seal to form a movable seal that prevents entry of ambient air through an air inlet.

56. The filter port according to claim 55, wherein the filter seal travels along the longitudinal axis with the biasing member of the filter port relative to the base and reaches a resting location that sealably prevents ambient air from entering the opening when the filter is disengaged from the filter port.

57. The filter port according to claim 56, wherein the filter seal forms the movable seal at a resting location when the biasing member attains a maximum point of expansion.

58. The filter port according to claim 57, wherein the biasing member is compressed when the protection filter is connected to the filter port.

* * * * *